Oct. 6, 1970 SHIGEO SUZUKI 3,532,833
MAGNETIC HEAD POSITIONING AND TRACK INDICATING DEVICE
Filed March 22, 1967
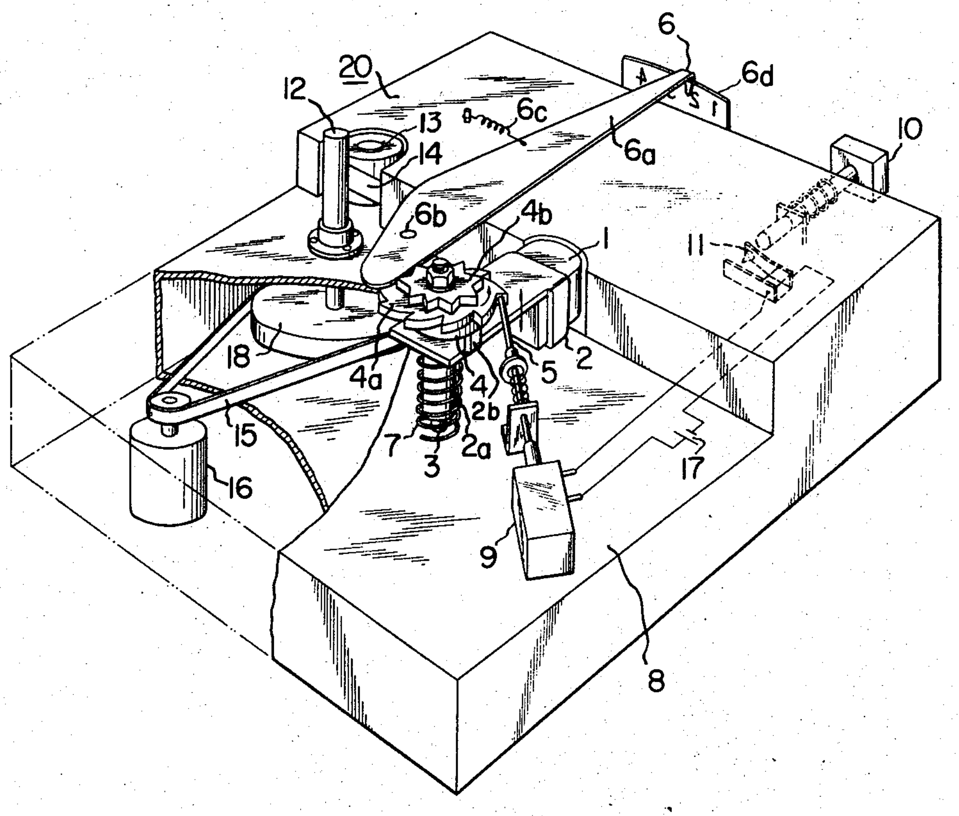

3,532,833

MAGNETIC HEAD POSITIONING AND TRACK INDICATING DEVICE

Shigeo Suzuki, Tokyo-to, Japan, assignor to Beltek Kabushiki Kaisha, Tokyo-to, Japan Filed Mar. 22, 1967, Ser. No. 625,224
Claims priority, application Japan, Mar. 30, 1966 (utility model), 41/28,059
Int. Cl. G11b 21/08
U.S. Cl. 179—100.2 1 Claim

ABSTRACT OF THE DISCLOSURE

A magnetic head to operate in conjunction with a recording tape having multiple tracks is mounted on a movable support member which is actuated by a ratchet wheel and cam mechanism so as to position the head selectively with respect to the tape tracks. At the same time, an indicating pointer is operated by the movement of the ratchet wheel through another cam to indicate the track at which the head is positioned. The ratchet wheel and cam mechanism is controllably operated by a push button at an easily accessible position.

BACKGROUND OF THE INVENTION

This invention relates to tape recorders and the like devices in which a magnetic head operates in conjunction with a loaded multiple-track recording tape. More particularly, the invention relates to a new magnetic head positioning and track indicating device capable of selectively positioning the head with respect to any of the multiple tracks and, at the same time, of indicating the identity of the track at which the head is thus positioned.

Recently, there htas been a trend toward an increase in the use of magnetic recording tapes of the multiple-track type and toward increases in the number of tracks on one tape. This thrend leads to the difficulties of accurately positioning the magnetic head at a selected track and of accurately distinguishing this track.

It is an object of the present invention to overcome these difficulties by providing a device of simple construction and operation to position a magnetic head accurately at any selected track of a multiple-track tape and to indicate accurately the identity of that track, this device being easily controllable from the outside.

SUMMARY OF THE INVENTION

According to the present invention, there is provided a magnetic head positioning and track indicating device for multitrack magnetic recording and reproducing apparatus, which comprises a base structure, a vertical stem affixed at its lower end to the base structure, a sleeve slidably disposed on said vertical stem, a supporting arm fixed at one end thereof to the sleeve, a magnetic head carried by the other end of the arm, spring means encompassing the sleeve with one end of the spring means engaging the base structure and the other end engaging the supporting arm for exerting a constant upward force on the supporting arm, a ratchet wheel carried adjacent the upper end of the vertical stem, a first cam integrally formed on the lower surface of the ratchet wheel, a second cam formed on the upper surface of the ratchet wheel, a lug on the supporting arm engaged with the first cam for controlling up and down movement of the magnetic head, an indicating pointer pivoted adjacent one end thereof to the base structure and engaged with the second cam and movable thereby, a scale on the base structure, the opposite end of the pointer coacting with the scale to show the track at which the magnetic head is positioned, and a driving member capable of executing forward and return reciprocating movements operably related to the ratchet wheel for effecting movement of the ratchet wheel through an angle corresponding to one tooth thereof, with the first and second cams rotating through the same angle and the magnetic head moving vertically by one shift distance corresponding to the spacing of the sound tracks on a recording tape via the first cam and lug and the indicating pointer via the second cam through an angle for causing the opposite end thereof to move through one division on the scale to indicate the position of the magnetic head.

The nature, principle, and details of the invention will be more clearly apparent from the following detailed description with respect to a preferred embodiment of the invention when read in conjunction with the accompanying drawing.

BRIEF DESCRIPTION OF THE DRAWING

In the drawing, the single figure is a diagrammatic perspective view partly broken away showing the essential parts of the example of the device according to the invention.

DETAILED DESCRIPTION OF THE INVENTION

Referring to the drawing, there is diagrammatically illustrated an example of a tape recorder 20 loaded with a multiple-track sound recording tape 14. The tape 14 is backed by a roller 13 and driven by a capstan 12 which, together with a flywheel 18, is driven by a motor 16 through a belt 15 in a known manner.

In the example shown of preferred embodiment of the invention, a magnetic head 1 is supported on a head supporting arm 2 which is integrally fixed to a sleeve 2*a*. The sleeve 2*a* is slidably fitted onto a vertical support stem 3 fixed at its lower end to a structural part 8 of the tape recorder 20. Thus, the integral assembly of the magnetic head 1, supporting arm 2, and sleeve 2*a* can move vertically, whereby the vertical position of the magnetic head 1 with respect to the multiple-track magnetic tape 14 in a loaded state for sound recording or reproducing can be varied, it being assumed that the tape 14 is to travel horizontally with its surface in a vertical plane.

A coil spring 7 is disposed around the sleeve 2*a* and between the structural part 8 and the supporting arm 2 and constantly exerts an upward force on the arm 2.

The upper part of the support stem 3 rotatably supports a ratchet wheel 4*a* with a cam 4 for vertical actuation of the head 1, which cam 4 is formed integrally on the lower side of the ratchet wheel 4*a* and engaged with a cam follower lug 2*b* formed on the upper part of the supporting arm 2.

A cam 4*b* for driving an indicating pointer 6 is formed on the upper side of the ratchet wheel 4*a* and is engaged with one arm of a pointer lever 6*a* constituting the pointer 6 and pivoted about a pivot 6*b*. A return spring 6*c* is connected at its one end to the pointer lever 6*a* to exert a moment whereby the pointer lever 6*a* is constantly maintained in contact with the cam 4*b*. The extreme free end of the pointer 6 moves over an indicating scale 6*d* for indicating the vertical position of the magnetic head 1, that is, the track at which the head 1 is positioned.

The ratchet wheel 4*a* is actuated by a driving member 5 which is controllably operable by an externally installed and externally manipulatable push button 10 by way of a suitable known mechanism. In the illustrated example, this mechanism comprises a switch 11 adapted to be actuated by the button 10, an electric power supply 17, and a solenoid 9 connected in series with the switch 11 to the power supply 17 and having a plunger which, in conjunction with a return spring, actuates the driving member 5 each time the button 10 is pushed to close the switch 11 and thereby energize the solenoid 9.

The driving member 5 is thus operated with stepwise cycles of forward-and-return reciprocating movements, with each cycle causing the ratchet wheel 4*a* to move through an angle corresponding to one tooth thereof. The driving member 5 may be adapted to operate as a detent to hold the ratchet wheel 4*a*, when at rest, at precise angular positions corresponding to respective track positions of the magnetic head. Alternatively, a separate detent device may be provided for the same purpose.

The device of the above described construction and arrangement according to the invention operates in the following manner.

When the magnetic head 1 is to be shifted vertically for changing of sound tracks on the recording tape, the driving member 5 operated by the push button 10 is caused to undergo one cycle of forward-and-return reciprocating movement thereby to rotate the ratchet wheel 4*a* through an angle corresponding to one tooth thereof. Accordingly, the cams 4 and 4*b* integrally formed with the ratchet 4*a* also rotate through the same angle.

The cam 4 engaged with the cam following lug 2*b* thereby causes the magnetic head 1 to shift vertically by one shift distance corresponding to the spacing of the sound tracks on the recording tape. At the same time, the cam 4*b* moves the indicating pointer 6 through an angle such that its pointing tip moves through one division on the scale to a suitable mark indicating the new position of the magnetic head 1.

By operating the driving member 5 at an appropriate number of times in this manner, the magnetic head 1 can be shifted to the position of any desired sound track on the recording tape, while, at the same time, the pointer 6 continuously indicates that track. Thus, the operator can continuously observe the exact position of the magnetic head 1 and thereby avoid errors in operation.

By suitably selecting the configuration and dimensions of the cam 4*b*, the dimensions of the pointer lever 6*a*, and the position of the pivot 6*b* relative to the ends of the pointer lever 6*a*, the movements of the magnetic head 1 can be indicated by the pointer 6 on a scale of any desired magnification for distinct indication.

What I claim is:

1. A magnetic head positioning and track indicating device for multitrack magnetic recording and reproducing apparatus, comprising a base structure, a vertical stem affixed at its lower end to said base structure, a sleeve slidably disposed on said vertical stem, a supporting arm having opposite ends, said arm being fixed at one end thereof to said sleeve, a magnetic head carried by the other end of said arm, spring means engaging the base structure and the supporting arm for exerting a constant upward force upon said supporting arm, a ratchet wheel having upper and lower surfaces, said ratchet wheel being carried adjacent the upper end of said vertical stem, a first cam integrally formed on the lower surface of said ratchet wheel, a second cam formed on the upper surface of said ratchet wheel, a lug on said supporting arm engaged with said first cam for controlling up and down movement of said magnetic head, an indicating pointer having opposite ends, said pointer being pivoted adjacent one end thereof to said base structure and engaged with said second cam and movable thereby, a scale on the base structure, the opposite end of said pointer coacting with the scale to show the track at which the magnetic head is positioned, spring means connected to the base structure and indicating pointer constantly maintaining said pointer in engagement with said second cam, and a driving member capable of executing forward and return reciprocating movements operably related to said ratchet wheel to effect movement of said ratchet wheel through an angle corresponding to one tooth thereof with said first and second cams rotating through the same angle and said magnetic head moving vertically by one shift distance corresponding to the spacing of the sound tracks on a recording tape via said first cam and lug and said indicating pointer via said second cam through an angle for causing the opposite end thereof to move through one division on the scale to indicate the position of the magnetic head.

References Cited

UNITED STATES PATENTS

| | | | |
|---|---|---|---|
| 2,422,143 | 6/1947 | Somers et al. | 179—100.2 |
| 2,468,198 | 4/1949 | Heller | 179—100.2 |
| 2,513,423 | 7/1950 | Owens | 179—100.2 |
| 3,056,302 | 10/1962 | Proctor | 179—100.2 |
| 3,372,937 | 3/1968 | Flint | 179—100.2 |
| 3,370,131 | 2/1968 | Reed | 179—100.2 |

JAMES W. MOFFITT, Primary Examiner

R. S. TUPPER, Assistant Examiner

U.S. Cl. X.R.

274—4